O. F. ZAHN.
ROLLER BEARING.
APPLICATION FILED JULY 15, 1920.
1,422,162.
Patented July 11, 1922.
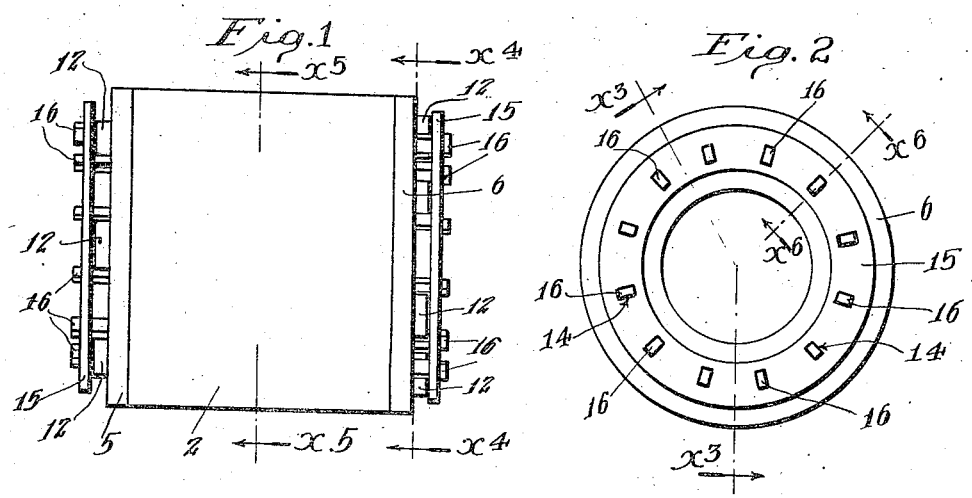
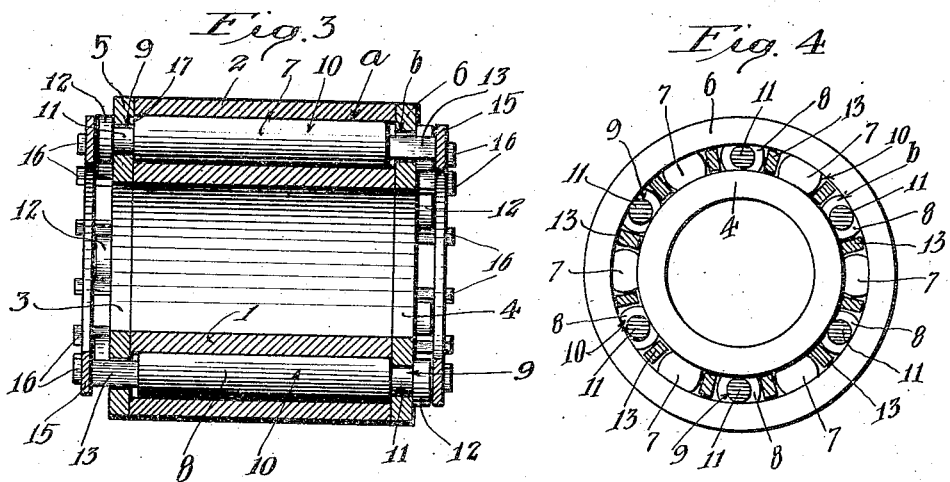
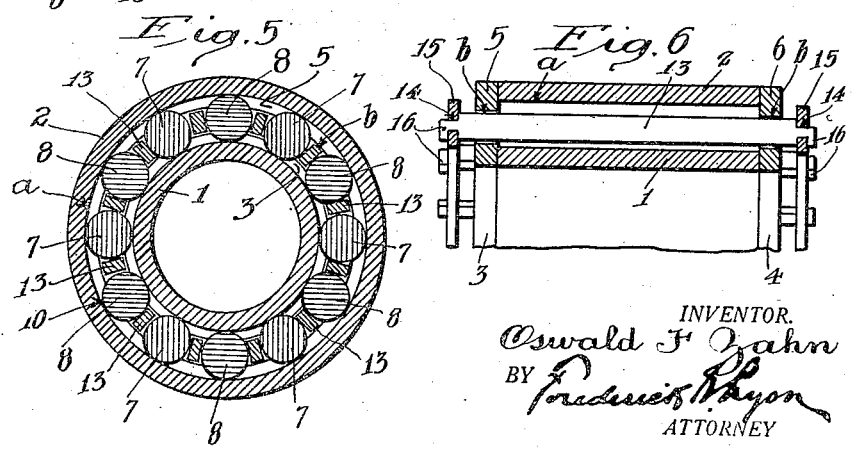
INVENTOR.
Oswald F. Zahn
BY Frederick Lyon
ATTORNEY

UNITED STATES PATENT OFFICE.

OSWALD F. ZAHN, OF LOS ANGELES, CALIFORNIA, ASSIGNOR TO ZAHN SELF RIGHTING ROLLER BEARING COMPANY, OF LOS ANGELES, CALIFORNIA, A CORPORATION OF CALIFORNIA.

ROLLER BEARING.

1,422,162.     Specification of Letters Patent.     Patented July 11, 1922.

Application filed July 15, 1920. Serial No. 396,432.

*To all whom it may concern:*

Be it known that I, OSWALD F. ZAHN, a citizen of the United States, residing at Los Angeles, in the county of Los Angeles and State of California, have invented a new and useful Roller Bearing, of which the following is a specification.

This invention relates to a type of roller bearing in which there are two distinct sets of rollers.

An object of the invention is to provide an easily assembled bearing and one that will function to transmit end thrust in either direction or in both directions.

An important object is to produce a strong, compact bearing.

Another object is to maximize the area of the thrust wearing surfaces.

Another object is to provide a bearing in which the end thrust is taken in either direction by two different sets of rollers.

Other objects and advantages will appear hereinafter.

The accompanying drawings illustrate the invention:

Figure 1 is a side elevation of a bearing constructed in accordance with the provisions of this invention.

Fig. 2 is an end elevation of the bearing from the left of Fig. 1.

Fig. 3 is a vertical mid section on line indicated by $x^3$—$x^3$ Fig. 2.

Fig. 4 is an elevation, partly in section, on line indicated by $x^4$—$x^4$ Fig. 1.

Fig. 5 is a vertical section on line indicated by $x^5$—$x^5$ Fig. 1.

Fig. 6 is a fragmentary sectional elevation on line indicated by $x^6$—$x^6$ Fig. 2.

There is provided spaced cylindrical inner and outer bearing members 1, 2, respectively. Adjacent the opposite ends of the inner bearing member 1 are inner thrust rings 3, 4, and adjacent the opposite ends of the outer bearing member 2 are outer thrust rings 5, 6, the inner and outer thrust rings being spaced from one another and the space being designated $b$.

In the space $a$ between the bearing members 1, 2 are mounted two sets or series of rollers, the rollers of one set being indicated at 7 and the rollers of the other set at 8. The rollers 7, 8 are provided with annular grooves 9, the grooves of the rollers 7 being engaged by the one pair of rings 3, 5, and the grooves of the rollers 8 being engaged by the other pair of rings 4, 6. The rollers 7 alternate with the rollers 8 or, in other words, the rollers of one set are interposed between the rollers of the other set. This permits the rollers to be placed quite close together and at the same time any end thrust on the bearing will be distributed to both ends of the bearing at points on the thrust rings spaced considerably from one another. Each of the rollers 7, 8 comprises a bearing portion 10 engaging the bearing members 1, 2, a reduced portion 11 which forms the groove 9, and a head 12 positioned adjacent the outer faces of the thrust rings 3, 5 or 4, 6, as the case may be. These heads 12 function to transmit end thrust as will be explained hereinafter.

The bearing portions 10 of the rollers are slightly shorter than the length of the bearing members 1, 2 so as not to bear against the adjacent thrust rings 3, 5 or 4, 6, as the case may be.

The rollers 7, 8 may be placed sufficiently close to one another to substantially fill the space $a$, if desired, but in the drawings I have shown a spacing cage separating the rollers slightly and constructed as follows: Between each two adjacent rollers 7, 8 is inserted a spacing member 13 which is sufficiently long and narrow to pass through the spaces $b$ between the rings, 3, 5 and 4, 6 and to project beyond the outer faces of said rings. The projecting ends of the spacing members 13 pass through slots 14 in cage rings 15 and the end portions of the spacing members are headed over at the outer faces of the cage rings as indicated at 16. The cage rings 15 are spaced sufficiently from the adjacent thrust rings to accommodate the heads 12 of the rollers between the cage rings and thrust rings.

Assuming that the bearing is mounted on a shaft or axle, not shown, and that end thrust comes, for example, upon the outer thrust ring 5, said ring will transmit the thrust to the shoulders 17 of the rollers 7 and said rollers will transmit the thrust through the heads thereof to the inner thrust ring 3 which in turn will be held against movement to the right by thrusting against the inner bearing member 1, said inner bearing member of course being in fixed position on the shaft as, for example, abutting a shoulder on the shaft.

Not only is end thrust taken in the manner just described, but any tendency to shifting to the right of the outer bearing member 2 will cause said member to thrust against the ring 6 which in turn thrusts against the heads 12 of the rollers 8, and the heads 12 transmit the thrust through the reduced portions 11 of the rollers to the inner thrust ring 4 that transmits the thrust to the shaft.

From the foregoing it is clear that both sets off rollers function to take the end thrust, one set transmitting the thrust at one end of the bearing to the shaft and the other set transmitting the thrust at the other end of the bearing to the shaft; and it is seen that, though the two sets of rollers function separately to transmit the end thrust at the opposite ends of the bearing, the two sets of rollers function as one set to support the load applied radially to the bearing.

The bearing described above is especially useful in heavy duty construction where relatively great loads are to be supported. In heavy duty bearings, separators or cages are of slight importance for under heavy loads, if the rollers were inclined to skew, the cage itself could not prevent such skewing as it would be torn or broken. With the special arrangement of the rollers and thrust rings, as described above, skewing of the rollers will not be possible, since any tendency of one set to skew to one side will be offset by the tendency of the other set of rollers to skew to the opposite side, because the rollers of one set take the end thrust reversely to the taking of the end thrust by the other set of rollers.

Among the advantages which the above described bearing offers are absolute alinement of rollers, double thrust strength, double thrust wearing surfaces, and maximum strength for heavy duty construction requiring resistance to end thrusts and radial loads.

I claim:

1. A roller bearing comprising spaced inner and outer bearing members, inner and outer thrust rings at the ends of the bearing members respectively, two sets of rollers between the bearing members having annular grooves, the rings at one end engaging the grooves of only one set of rollers and the rings at the opposite end engaging the grooves of only the second set of rollers, and the rollers of one set being interposed between the rollers of the other set.

2. A roller bearing comprising spaced inner and outer bearing members, inner and outer thrust rings at the ends of the bearing members respectively, a set of rollers between the bearing members engaged only with the thrust rings at one end, a second set of rollers between the bearing members engaged only with the thrust rings at the opposite end and interposed between the rollers of the first set, spacing members between the rollers of different sets extending between the inner and outer thrust rings, and other rings fastened to the ends of the spacing members.

3. A roller bearing comprising inner and outer bearing members, two sets of rollers, one set being offset endwise with respect to the other set and the rollers of one set being interposed between the rollers of the other set, means co-operating with the rollers of one set at one end only thereof to prevent thrust in either endwise direction, means co-operating with the rollers of the other set at one end only thereof to prevent thrust in either endwise direction, the thrust preventing means for one set being at the opposite end of the bearing from the thrust preventing means of the other set, spacing members interposed between adjacent rollers and projecting beyond the thrust-preventing means, and spacing means connected with the ends of the spacing members.

Signed at Los Angeles, California, this 7th day of July, 1920.

OSWALD F. ZAHN.

Witnesses:
GEORGE H. HILES,
L. BELLE WEAVER.